March 4, 1969     J. A. OELRICH     3,430,536

TIME MODULATED PNEUMATICALLY ACTUATED CONTROL MECHANISM

Filed March 21, 1967

INVENTOR.
JOHN A. OELRICH

BY Radford W. Luther
ATTORNEY

United States Patent Office 3,430,536
Patented Mar. 4, 1969

3,430,536
TIME MODULATED PNEUMATICALLY ACTUATED CONTROL MECHANISM
John A. Oelrich, Granby, Conn., assignor to Chandler Evans Inc., West Hartford, Conn., a corporation of Delaware
Filed Mar. 21, 1967, Ser. No. 624,875
U.S. Cl. 91—47     11 Claims
Int. Cl. F15b 13/02

ABSTRACT OF THE DISCLOSURE

Control apparatus having a time referenced electrical carrier signal combined with a variable electrical analogue input signal to provide a single time modulated pulsed electrical output signal. A solenoid connected to a three port valve with the solenoid actuated by the pulsed output electrical signal to operate the three port valve. The three port valve connected to a pressurized gas supply and a pneumatically compliant actuator assembly where the three port valve is operated by the solenoid at a pulse frequency greater than the initial frequency of the complete control system to thereby produce a substantially nonpulsating pressure that is converted by the actuator into a substantially nonpulsating amplified control force proportional to the variable electrical analogue input signal.

Background of the invention

This invention relates to a control system for operation in conjunction with a command input signal; and more particularly has reference to a control system in which a carrier signal in combination with an input signal produces a modulated input signal that is pneumatically converted into a force output signal; the magnitude of the force being proportional to the magnitude of the input signal over the complete range of input signal operation. The invention also concerns a control unit in which a time referenced carrier signal is combined with an analogue electrical input signal to produce a time modulated electrical output signal that is converted into a force signal having a time integrated substantially continuous steady state force output. This invention also concerns a control unit in which an analogue electrical input signal and a symmetrically time referenced carrier signal are combined to produce a time modulated output signal of low energy level that is converted and amplified to a substantially continuous force output of high energy level with each finite magnitude of force proportional to a corresponding finite magnitude of input signal.

The invention will be described with specific reference to a missile guidance system; its utility in other applications, however, will be readily apparent. Many missile systems use target tracking devices located in the missile as the primary means of guiding the missile to a preselected target. One common type of target tracking system well known in the art produces an electrical signal that indicates the instantaneous angular rate of change of the line-of-sight of the tracking device with respect to the target. The tracking device provides an electrical output signal of relatively low energy level. This low energy level electrical signal is converted into a force capable of operating the missile steering device that is used in combination with the guidance device to steer the missile in response to the guidance electrical command signals.

One well known method of providing the force necessary to directly move the control surfaces of a missile when these control surfaces are subjected to great aerodynamic pressure is by means of power amplifying actuating devices that convert a signal of low energy level received from the guidance system into a large power signal sufficient to directly move the missile control surfaces. The convention power amplifying system employs a position proportional to input signal servo-actuation organization which is generally operated closed loop. This system, when operated closed loop produces as a function of an input command signal a variable continuous position the magnitude of which is independent of control surface load force within the design limits of the power amplifying actuator device.

Summary of the invention

The instant invention concerns an open loop servo-actuation power amplifying system that can provide a substantially nonpulsating torque output that is proportional to a variable time modulated electrical analogue input signal over the complete range of input signal operation, while simultaneously amplifying the time modulated input signal to a substantially continuous nonpulsating force level sufficient to move the control surface. This mechanism produces a torque output that is proportional to the input signal and independent of the control surface position within the power limits of this design.

Accordingly, it is an object of the present invention to provide an improved force balance control unit having the ability to receive a varying electrical input signal and combine said electrical input signal with a carrier signal to provide a time modulated signal that in cooperation with fluid transfer means converts said electrical input signal into a substantially continuous force output each incremental value of said force output being proportional to a corresponding incremental value of electrical input signal.

Another object of the invention is to provide a control system capable of receiving a continuous but variable electrical input signal, combining said input signal with a symmetrical carrier signal to produce a time modulated signal and converting said time modulated signal into an amplified force output having a substantially nonpulsating steady state time integrated force output proportional to the degree of modulation.

Another object of the invention is to provide a control unit in which an electrical input signal is combined with a carrier signal to provide a time modulated signal that controls an electrical switching circuit through which fluid transfer valves control an actuator to provide a substantially uninterrupted even amplified force output which can be converted to an output torque, each value of said force output being proportional to the corresponding value of electrical input signal.

Still another object of this invention is to provide a control unit having a carrier electrical signal wherein said carrier signal is combined with an electrical input signal to provide an electrical signal which is applied to a pneumatic power amplifying device through a time modulated pulse actuated fluid transfer valve to convert the modulated electrical signal into a substantially nonpulsating time integrated steady state force wherein each value of said force is proportional to a corresponding value of electrical input signal.

A more specific object of the invention is to provide a missile flight control having an electrical carrier signal wherein said carrier signal is combined with a varying electrical analogue input command signal to provide a modulated electrical signal that is utilized in combination with a time modulated pulse controlled fluid transfer valve and a pneumatic actuator system to provide an amplified steady state force output that is substantially continuous and nonpulsating on a time integrated basis, in which each finite magnitude of said force output is proportional to a corresponding finite magnitude of electrical input signal.

Description of the drawings

The following is a detailed description of the drawings applicable to the instant invention.

FIGURES 3(a) through 3(j), inclusive except i, are diagrams of certain operating characteristics of the power amplifying and control device shown in FIGURES 1 and 2.

Description of the preferred embodiments

In general, the present invention is utilized in a class of guided missiles that utilize steering fins to guide the missile along a navigated flight path. These missiles utilize some form of guidance system to provide the necessary guidance intelligence that is communicated to the control system during the flight of the missile to permit the missile to be guided to the preselected target. The control unit utilizes the intelligence received from the guidance system to develop a torque that positions the steering fins of the missile to steer the missile along a navigated flight path.

The instant control unit utilizes a servo-actuator system that applies the intelligence received from the guidance system to produce a force output as a function of the guidance input signal that is independent of actuator position within the design limits of the particular actuator system. The instant guidance unit by the interaction of the control unit and the steering fins produces a continuous torque that is applied to the missile as a steering torque, the magnitude of said torque in the case of a constant torque arm being proportional to the magnitude of the signal received from the guidance system. This input signal-steering torque proportionality relationship permits the torque balance principle to be applied to the design of missile guidance control systems. The torque balance principle as applied to control units utilized in conjunction with the steering fins of guided missiles is described in U.S. Patent application entitled "Control Mechanism" of inventor Jack O. Nash, filed on Oct. 18, 1966, and assigned to the same assignee as in the instant application, to which reference may be had for a detailed explanation of the torque balance principle.

Economic reasons dictate the need for an open loop control system that can achieve force or torque balance by the use of a simple non-linear servo-valve arrangement. Broadly comprehended, the time modulated control system as herein disclosed comprises the concept of an open loop control system that can achieve force balance by using a simple non-linear servo-valve and simultaneously provide an amplified force output that is proportional to the input command signal.

In order to facilitate an understanding of the concept of time modulation and the problems associated with the operation of time modulating force amplifying control mechanisms solved by the instant invention, an understanding of the principle of time modulation and the application of this principle to the operating characteristics of pressurized fluid operated actuators will be presented.

Time modulation of the control organization of the instant invention is achieved by pulse actuation of the control system fluid transfer valve elements such that the time integrated steady state effect produces a pressure or pressure differential that is substantially continuous and non-pulsating and is proportional to the degree of modulation. For clarity of presentation, the relationship between the modulated input signal and the pressure response of the actuator to this modulated input signal can best be illustrated by comparison with the conventional pulse width modulation principle of operation, well known in the art.

Figure 1:
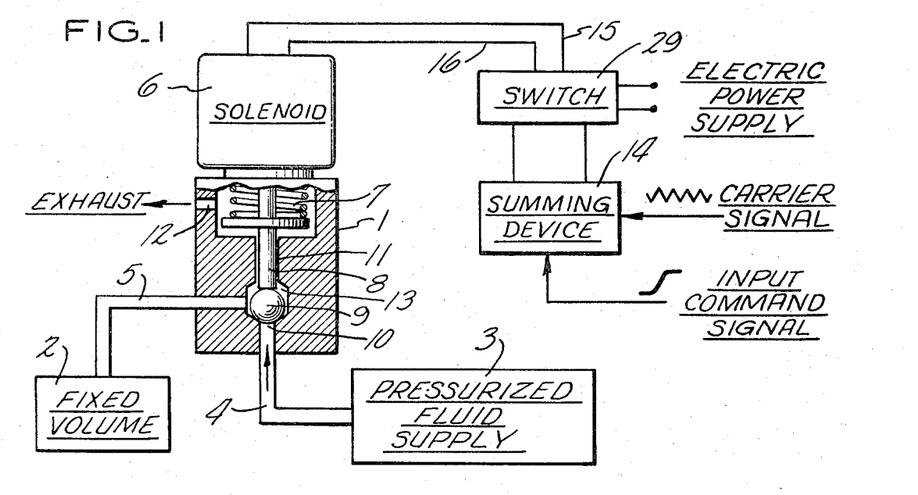
FIGURE 1, included for comparison purposes, is a sectional view of a conventional pulse width modulated three-way valve discharging into a fixed volume container.
Figure 3:
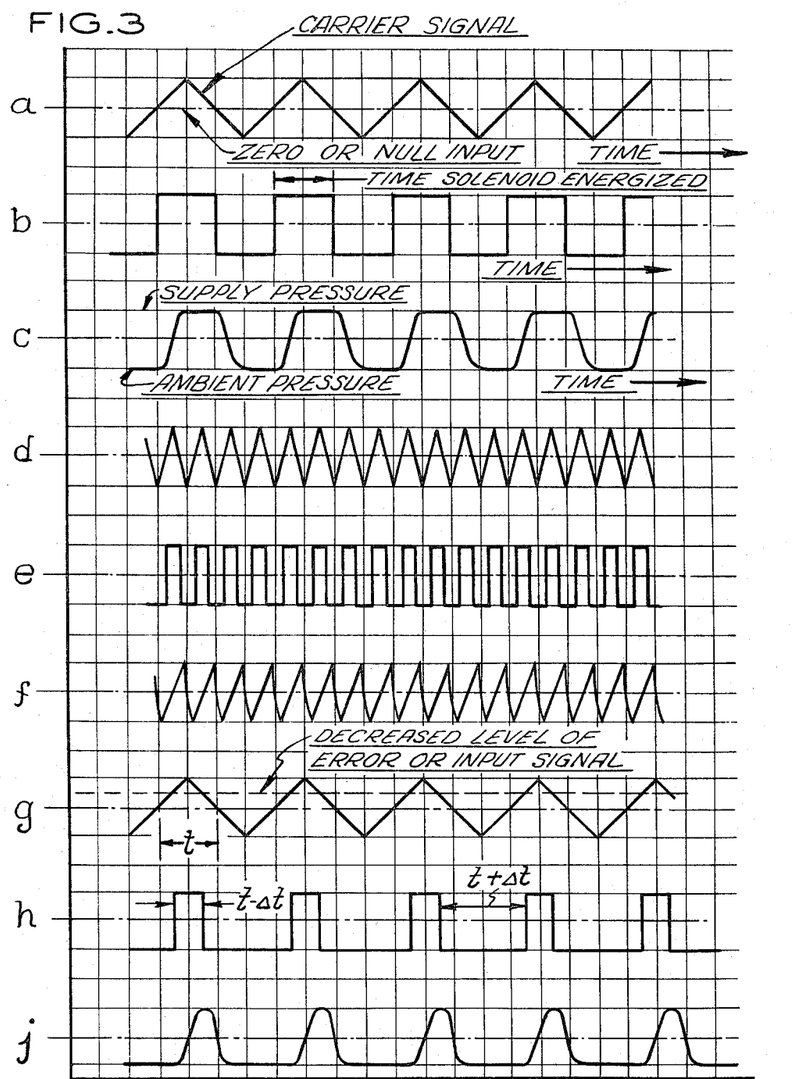

FIGURE 1 shows generally at 1 a three-way valve that controls the charging of a fixed volume 2 from a source of pressurized fluid 3 via interconnecting conduits 4 and 5. When solenoid 6 is de-energized, spring 7 urges plunger 8 into engagement with ball 9 such that ball 9 is urged into sealing engagement with ball seat 10, thereby preventing pressurized fluid from entering fixed volume 2 via conduit 5. Simultaneous with the engagement of ball 9 and seat 10, fixed volume 2 is exhausted to atmosphere via conduit 5 and interconnecting exhaust ports 11 and 12, thus permitting the magnitude of the pressure in chamber 2 to be reduced to the level of the atmospheric pressure. When solenoid 6 is energized, plunger 8 is retracted compressing spring 7 such that ball 9 engages seat 13, thereby sealing conduit 5 from exhaust port 12. Simultaneously, pressurized fluid is permitted to enter fixed volume 2 via interconnecting conduits 4 and 5, thus permitting the magnitude of the pressure in chamber 2 to rise to the level of that of supply pressure 3. A symmetrical carrier signal such as a sinusoidal or triangular wave as shown is supplied to summing device 14 from a source or generating device well known in the art. Summing device 14 is connected to solenoid 6 through switch 29 and electrical conduits 30 and 31, by means of electrical conduits 15 and 16. The input command signal generated by any of several types of guidance system devices well known in the art is supplied to summing device 14. By methods well known in the art, the carrier signal and the input command signal are summed by summing device 14 such that at a preselected single magnitude, called the threshold, switch 29 causes the solenoid valve 6 to switch from the de-energized to the energized position. It can be seen from FIGURE 3(a) that a projection of the threshold or null line at the points of intersection with the triangular shaped carrier signal will produce the square wave solenoid duty cycle shown in FIGURE 3(b). It can be seen from the duty cycle curve of FIGURE 3(b) that the solenoid is energized exactly the same amount of time that is de-energized. This defines the zero or null condition. If the level of the input signal is varied from the value that establishes the zero or null, the solenoid will be either energized or de-energized for a larger portion of the time history dependent upon the magnitude of the input signal variation. If an input signal of decreased level (below the null value) is superimposed as shown in FIGURE 3(g) and the decreased level of input signal at its point of intersection with the ramp shaped carrier signal is projected into a duty cycle history, as shown in FIGURE 3(h), the time that the solenoid is energized is less than the time that the solenoid is de-energized. It can be seen from a comparison of FIGURES 3(b) and 3(h) that at input signal levels other than the zero or norm magnitude, the time the solenoid is in either the energized or de-energized positions varies proportional to the magnitude of the input command signal. It can be seen from the time-pressure history curves of FIGURES 3(c) and 3(j) that at very low carrier frequencies the time response characteristics of valve 1 and fixed volume 2 are such that the pressure in fixed volume 1 goes from ambient to supply pressure and back to ambient. The effect of modulation of the carrier signal at low carrier frequencies by variation of the magnitude of the input command signal is to retain the pressure level in fixed volume 2 at either supply pressure or ambient pressure for a greater or lesser period of time for each complete cycle, dependent upon the magnitude of the input signal. It can be seen by a comparison of FIGURES 3(c) and 3(j) that the integration of these time-pressure history curves with respect to time will produce an average pressure in fixed volume 2 having a magnitude proportional to the magnitude of the input command signal.

Figure 2:
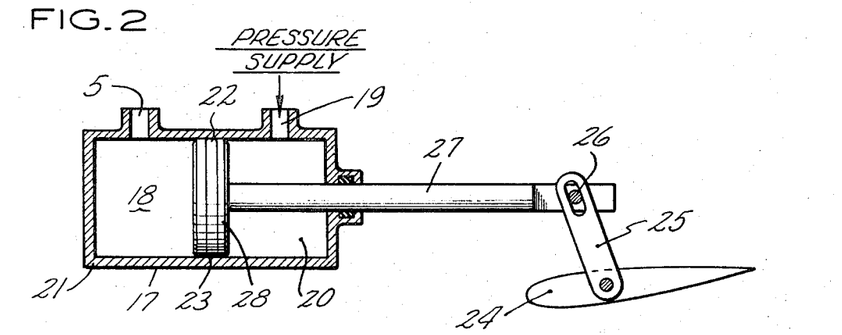
FIGURE 2, included for comparison purposes, is a sectional view of a conventional half area piston double acting actuator with accompanying control surface and interconnecting linkage that can replace the fixed volume container of FIGURE 1.

Similarly, it can be seen by substituting actuator 17 of FIGURE 2 for the fixed volume 2 of FIGURE 1, and by means of a T connection in conduit 4 connecting fluid supply 3 directly to chamber 20, the control system of FIGURE 1 can be utilized to control the guide fins of a missile.

In FIGURE 2, conduit 5 is connected to chamber 18 of the actuator shown generally at 17, and conduit 19 is directly connected to the source of pressurized fluid 3 such that chamber 20 of actuator 17 is in constant fluid communication with pressurized source 3 via conduit 19. Piston 28 is axially slideably disposed in housing 21 and O-ring seal 22 is contained in circumferential groove 23 in piston 28 to provide an axial movable fluid tight sealing arrangement between chambers 18 and 20. Piston 28 is connected to aerodynamic control surface 24 through bell crank 25, journal pin 26 and connecting rod 27 such that bidirectional axial movement of piston 28 produces corresponding bidirectional rotary movement of aerodynamic control surface 24.

One area of piston 28 is subjected to the constant supply pressure present in chamber 20. To provide equal maximum force in both directions, the area of piston 28 subjected to the constant supply pressure is one-half the area of the opposite side of said piston exposed to the pressure in chamber 18. Thus, when the magnitude of the pressure in chamber 18 is exactly .5 supply pressure ($P_s$) a pressure of .5 $P_s$ is impresed upon the larger area of the output piston 28, and a balance and motion null condition exists. A pressure less than .5 $P_s$ results in a pressure differential such that axial motion of output piston 28 to the left results, while a pressure greater than .5 $P_s$ produces a pressure differential such that the axial motion of output piston 28 to the right results. Due to the variable volume of chamber 18 and the variable nature of the actuator loads, the time-pressure histories of chamber 18 will differ in detail from those of fixed volume 2. However, the over-all trends of both pressure traces are similar and those for the fixed volume may be used by way of example for either case. Referring to FIGURES 1 and 2, it can be seen, as shown above, that the integration with respect to time of the time-pressure history, as shown in FIGURES 3(c) and 3(j), will result in a time average actuator force (or torque) that is proportional to the magnitude of the input command signal. This principle, known as pulse width modulation, has been widely used in missile fin actuation systems for tactical missiles. As indicated, the integration with respect to time in this mode of control is at the output or load, that is, the whole range or magnitude of pressure level is involved. It can be seen from the above time-pressure history, shown in FIGURES 3(c) and 3(j) that the instantaneous pressure is strongly time dependent. To achieve a substantially continuous or nonfluctuating pressure level in fixed volume 2 or chamber 18, instantaneous pressure-time dependency must be eliminated or substantially reduced.

Referring to FIGURE 1, and FIGURES 3(d) through 3(f), it can be seen that the establishment of a nonfluctuating pressure in fixed volume 2 as a function of time can be greatly aided by increasing the frequency of the carrier signal. It can be seen from FIGURE 3(f) that as the frequency of the carrier signal is increased in the limit, a continuous steady state pressure is obtained in fixed volume 2, the exact magnitude of the resulting steady state pressure depending on the physical sizing of inlet orifice 10a, outlet orifice 11, interconnecting conduit 5, fixed volume 2 and the physical characteristics of the particular gas being used. All of these characteristics combine to form a pneumatic time constant. The fact that a steady state pressure can be obtained at all is due to this pneumatic time constant. It can be seen that with a zero time constant for the fixed volume 2, the pressure would fluctuate full range. Such a condition is essentially the case for the use of a hydraulic fluid without a compliant load. If a pneumatic time constant is considered, then it can be reasoned that the pressure amplitude attenuates with increasing frequency. However, considering the actual physical characteristics of the various components of a typical system, it has been the state-of-the-art conclusion that the frequency required to sufficiently attenuate the pressure and the ability to modulate on some orderly and finite basis within the time frame work of the required frequency does not exist unless feedback elements are employed. The departure from the state-of-the-art and the uniqueness of the instant invention is the ability of the instant apparatus utilizing a non-linear valve to obtain a substantially continuous pressure than can be modulated.

For purposes of clarity, the description of the instant apparatus and its use in obtaining a substantially continuous pressure signal that can be modulated by a non-linear valve will be extracted from a more complex control problem in which the physical characteristics of the control components and loads will not be considered.

Referring to FIGURE 1, assume the fully open discharge port 11 has an effective area twice that of the fully open inlet port 10a area. During operation one port of three-way valve 1 will be fully closed when the other port is fully open and a transient area condition normally exists during motion of ball valve 10. As the signal carrier frequency is gradually increased, with a constant zero level input command signal, it is found that the pressure amplitude in fixed volume 2 will attenuate. This attenuation can be seen from a comparison of pressure time history curves as shown in FIGURES 3(c) and 3(f). As the process is continued, a carrier signal frequency will be reached, depending on the sizing of the inlet and outlet valve areas relative to the volume, where the peak-to-peak pressure amplitude fluctuation in fixed volume 2 will have been attenuated to a very small amplitude (an acceptable level) and the mean pressure, in the particular case under consideration, will be essentially one-half the supply pressure $P_s$. The physical process that causes fixed volume 2 to exhibit a substantially nonfluctuating pressure whose magnitude is one-half of the magnitude of the supply pressure $P_s$ is one of the basic physical phenomenon upon which the operation of the instant invention rests.

Figure 4:
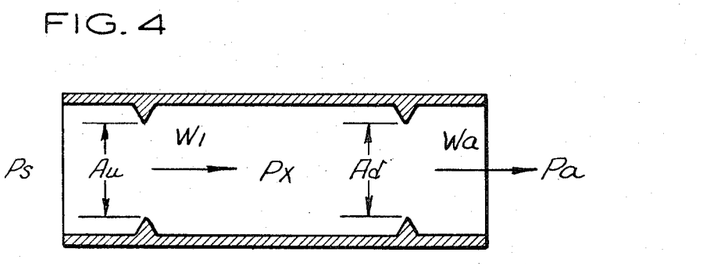
FIGURE 4, included for comparison purposes, is an axial sectional view of a conduit having two fixed area orifices in series.

As shown in FIGURE 4, it is well known in the field of fluid flow that the steady state pressure ratio $$\left(\frac{P_x}{P_s}\right)$$

of a volume intermediate fixed inlet orifice $A_u$ and fixed discharge orifice $A_d$ is a function of the orifice area ratio $$f\left(\frac{A_d}{A_u}\right)$$

Figure 5:
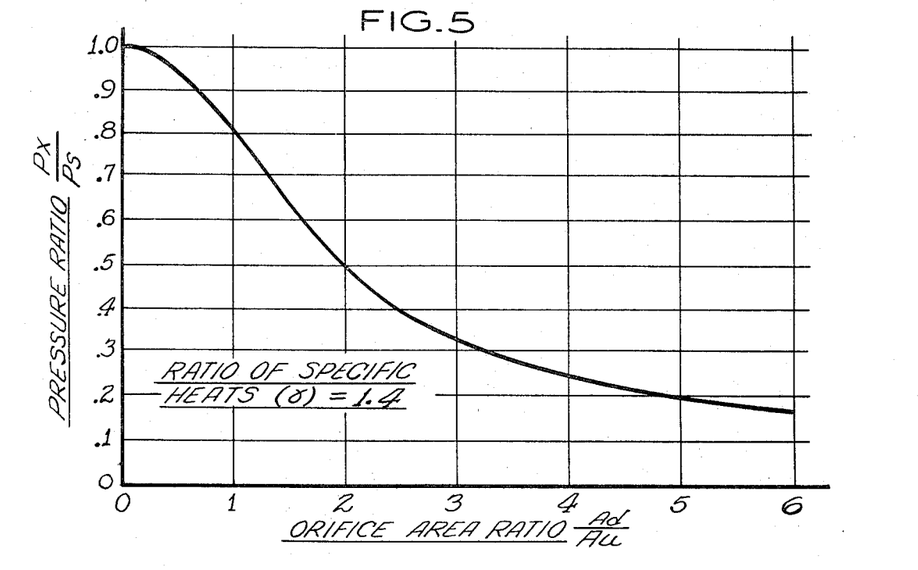
FIGURE 5 is a diagram of the operating characteristics of a conduit having two fixed area orifices in series with the downstream orifice always choked.

Referring to FIGURE 5, by way of example, it can be seen that for an elastic fluid with a specific heat ratio of 1.4 that for an area ratio of 2.0 the steady state pressure ratio in the fixed volume intermediate the two fixed orifices is 0.5. Thus, it can be seen from the curve of FIGURE 5 that with an area ratio of 2.0 the pressure in the volume intermediate the two fixed orifices, which is analogous in function to fixed volume 2, shown in FIGURE 1, is one-half the supply pressure $P_s$. When the area ratio $$\frac{\text{orifice } 11}{\text{orifice } 10a}$$

is equal to 2.0, the pressure in fixed volume 2 of FIGURE 1 is one-half of supply pressure (.5 $P_s$) for the dynamic zero command signal operation of the valve mechanism, shown in FIGURE 1, thus producing a pressure whose magnitude is the same as that found in the volume intermediate the two fixed orifices, shown in FIGURE 4. Hence, for steady state operation, a quasi steady state pressure has been achieved for the dynamic operation of FIGURE 1 at the null condition.

Referring again to FIGURE 5, it can be seen that under steady state conditions a variation in the effective area ratio of the valve will, in turn, cause a change in the pressure ratio. Assuming the dynamic operation of the organization shown in FIGURE 1 is conducted with a carrier signal frequency raised to a level sufficient to attenuate the peak-to-peak pressure amplitude fluctuation, the effective area ratio may be varied by modulation of the carrier signal by means of a varied input command signal, thus causing the valve 10 to be in the open or closed positions for proportionally different times. Assuming a small variation in the input command signal from the zero or null level were imposed on the organization shown in FIGURE 1 such that the valve 10 would be closed for a longer period of time than it was open, the valve 10 would be closed for a total period of $(t+\Delta t)$ time and open for a period $(t-\Delta t)$ of its previous time. This variation or modulation of the time base of the duty cycle plot is called the "time modulation" of the dynamic system shown in FIGURE 1.

From FIGURE 1, the first order effect of "time modulation" can be determined from an analysis employing classical thermodynamic relationships. The variation of the pressure in the fixed volume 2 in FIGURE 1 produced by a variation in time can be established by the following equation:

$$\frac{dp}{dt} = \frac{\gamma R T}{V} \frac{dm}{dt} \quad (1)$$

where:
P=pressure-LB$_f$/in.$^2$
t=time-sec.
V=volume in.$^3$
T=absolute temperature-°R
R=gas constant-in.-LB$_f$/LB$_m$-°R
m=mass-LB$_m$
$\gamma$=ratio of specific heats.

Assuming a step change in input command signal such that a step change of valve element 10 occurs, then on charging of fixed volume 2 the change of mass flow can be expressed as follows:

$$\frac{dm}{dt} = \frac{C_f A_u P_s}{\sqrt{T}} \quad (2)$$

where:
m=mass-LB$_m$
t=time-sec.
$C_f$=mass flow coefficient-$\sqrt{°\text{R/sec.}}$
and is expressed as:

$$C_f = \sqrt{\frac{g\gamma}{R} (2)^{\frac{\gamma+1}{\gamma-1}}}$$

P=pressure-LB$_f$/in.$^2$
T=absolute temperature-°R.
A$_u$=upstream orifice area-in.$^2$
g=gravitational constant Substituting Equation 2 into Equation 1, Equation 1 becomes:

$$\frac{dp}{dt} = \frac{\gamma C_f R \sqrt{T} A_u P_s}{V} \quad (3)$$

Similarly, assuming a step change of input command causing a step change in valve 1 on discharging of fixed volume 2, the change in mass flow rate can be expressed as follows:

$$\frac{dm}{dt} = -\frac{C_f A_d P_v}{\sqrt{T}} \quad (4)$$

where:
$P_v$=pressure in fixed volume-LB$_f$/in.$^2$
$A_d$=area downstream orifice-in.$^2$ Similarly, substituting Equation 4 into Equation 1, Equation 1 becomes:

$$\frac{dp}{dt} = -\frac{\gamma C_f R \sqrt{T} A_d P_v}{V} \quad (5)$$

It can be seen that dynamic operation of the three-way ball valve system of FIGURE 1 at a carrier signal frequency sufficient to produce a substantially continuous mean pressure $P_m$ will for small excursions or perturbations about the mean pressure $P_m$ permit the term $dp$ to be set equal to $\Delta P$ where the $\Delta P$ is the peak-to-peak pressure amplitude excursion. It can be seen that the magnitude of the $\Delta P$ applies to both charging and discharging, but the sign of the $\Delta P$ is reversed for charging and discharging functions with the minus sign used for the discharge function. In like manner, $dt=t$, the total time at the particular signal level. In the instant case, the time $t$ is expressed as a charging time $(t-\Delta t)$ and a discharging time expressed as $(t+\Delta t)$.

Substituting the $\Delta P$ and the $(t-\Delta t)$ obtained from the above analysis into Equation 3, Equation 3 becomes:

$$\Delta P = \frac{\gamma C_f R \sqrt{T}}{V} A_u P_s (t - \Delta t) \quad (6)$$

Similarly, substituting $\Delta P$ and $(t+\Delta t)$ obtained from the above analysis into Equation 5, Equation 5 becomes:

$$\Delta P = \frac{\gamma C_f R \sqrt{T}}{V} A_d P_v (t + \Delta t) \quad (7)$$

Equating Equations 6 and 7, we obtain the following equation:

$$\frac{P_v}{P_s} = \frac{A_u}{A_d} \left[ \frac{t - \Delta t}{t + \Delta t} \right] \quad (8)$$

From Equation 8 it can be seen that the first order results indicate the pressure ratio $P_v/P_s$ is a function of the area ratio $A_u/A_d$ and the magnitude of the time modulation. It can be seen that when $\Delta t = 0$, the steady state solution shown for $A_d/A_u$ equal to 2.0 in FIGURE 5 results. The time modulation can be effected in either direction, therefore, the complete general first order expression is as follows:

$$\frac{P}{P_s} = \frac{A_u}{A_d} \left[ \frac{t \pm \Delta t}{t \mp \Delta t} \right] \quad (9)$$

From Equation 9 it can be seen that for a fixed ratio of $A_u/A_d$ the variation in pressure ratio in fixed volume 2 is proportional to the magnitude of the time-modulation which in turn is a function of the magnitude of the input command signal variation from the null level.

Considering the gas flow through orifices $A_u$ and $A_d$ is either choked, as assumed above, or unchoked depending on the effective area ratio which results from the time-modulation, the first order solution, represented by FIGURE 5 and Equation 9, may be broadened to read:

$$\frac{P_v}{P_s} = f\left\{\frac{A_u}{A_d}\left[\frac{t \pm \Delta t}{t \mp \Delta t}\right]\right\} \quad (10)$$

By this relationship, the full range of pressure ratio of FIGURE 5 now applies to fixed volume 2 as a general expression. Equation 10 states that at time-modulation derived effective area ratios equal to the fixed area ratios of FIGURE 5, the corresponding pressure ratios of FIGURE 5 will obtain in the mean in fixed volume 2. Again, substituting actuator 17 for fixed volume 2, it can be seen that the volume of chamber 18 and hence the pneumatic time constant will vary with actuator motion. The result of this volume change is a variation in the peak-to-peak pressure amplitude excursion. Furthermore, it is to be understood that the magnitude of the pressure amplitude excursion is also affected by the impedance of the load. However, as will be shown in detail later in this description, the carrier signal frequency may be selected to make the magnitude of the pressure amplitude fluctuations operationally acceptable. In the instant application, the magnitude of the motion of the actuator responsive to actuator chamber pressure perturbations commonly termed the dither amplitude is a principal operation criteria. As developed for fixed volume 2, the Equation 10 expression may be applied to chamber 18 of actuator 17 for any axial position so that the mean pressure $P_m$ is made proportional to input command independent of position, the position being dependent on the impedance of the load. Linearity of this proportionality can be accomplished with this concept as with other concepts by means well known in the art.

The application of the principle of "time modulation" to a typical actuation system can best be presented by describing the classical open loop frequency response characteristics of a typical linear pneumatic control, and then present the dynamic characteristics of the time modulation concept with carrier frequency. A typical family of frequency response curves are shown in FIGURE 6.

Figure 6:
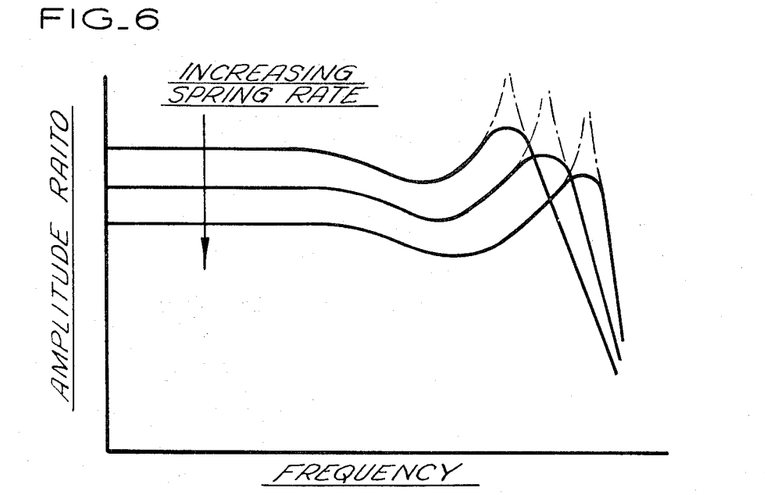
FIGURE 6 is a diagram, shown for purposes of comparison, of a representative family of frequency response curves of a conventional bidirectional power amplifying actuator and control system.

The family of curves, shown in FIGURE 6, are obtained by running the control at a constant load condition and an input command signal of preselected low amplitude to establish a base or reference amplitude ratio. The frequency of the input command signal is varied and the amplitude ratio variation (where amplitude ratio variation is defined as the ratio of the output amplitude at each test frequency to the input or command amplitude) at each test frequency is determined. The load spring rate is increased while the commanded amplitude is held constant and a new curve is generated for each new load spring rate. The family of curves of FIGURE 6 shows the relative attenuation of the amplitude ratio below the resonant or critical condition decreases for each incremental increase in load spring rate. Simultaneously, the system natural frequency increases for each incremental increase in load spring rate such that the critical or resonant peak moves to the right for each incremental increase in load spring rate. Successive curves are made and a family of characteristics obtained, as shown in FIGURE 6, which define the open loop control performance over the complete range of applicable spring rates. For dynamic systems, such as shown in FIGURE 1 and FIGURE 2, the general physical characteristics and type of loads establish the characteristics of the motion of the control elements. The control element motion characteristics associated with the carrier frequency are referred to as the dither amplitude. A typical system is usually constructed to have the relationship between the magnitude of the dither amplitude and the carrier signal frequency adjusted such that when the control is applied in missile control or other operation, the pressure fluctuation effect is essentially filtered to obtain the desired dither amplitude range at a frequency well above the band width of the item to be controlled.

Figure 7:
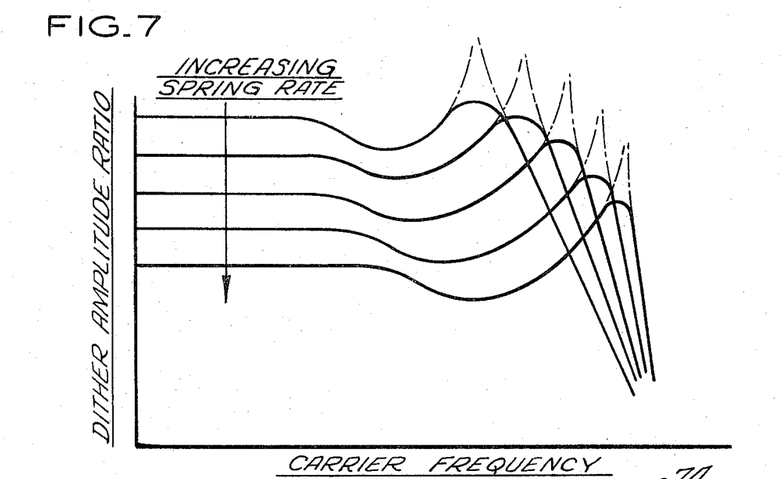
FIGURE 7 is a diagrammatic view of the comparative amplitude ratio curves of a control system embodying the principles and novel features of the instant invention.

A special "family" of curves, analogous to those set forth in FIGURE 6, can be obtained that define the range of frequencies from which may be selected a suitable carrier frequency range for the non-linear open loop dynamic operation of the organization shown in FIGURE 1 and FIGURE 2. Similar to the technique used to establish the curves in FIGURE 6, assume that at each different selected load spring rate the "input" is a symmetrical duty cycle signal to the solenoid whose frequency is the carrier frequency. The amplitude of the duty cycle fundamental may be used as a base of reference for establishing the relative change in amplitude ratio for variations with carrier frequency. The amplitude ratio is the ratio of the actuator output motion to the duty cycle fundamental. The amplitude ratio versus frequency trace obtained at a fixed given load condition presents an analysis of the same general nature as that generated by the conventional frequency response analysis shown in FIGURE 6. As the load spring rate is increased, the amplitude ratio will decrease and the resonance peak move to the right, as shown in FIGURE 6. A representative family of curves showing the dither amplitude ratio-carrier frequency response as a function of increasing spring rate is shown in FIGURE 7. The upper lefthand corner of the plot shown in FIGURE 7 where the spring rate and carrier frequency are low is the region of operation of the previously described pulse width modulation control concept. It is possible in the pulse width modulation mode of operation to operate the control system such that only the load spring rate is increased while the carrier frequency is held constant to the extent that the actuator motion responsive to the command signal is not the full actuator stroke although maximum torque is reached. This mode of pulse width modulated operation is called "torque limited operation." It can be seen from FIGURE 7 that as the carrier frequency is increased beyond the critical area, the family of curves tend to converge in a region where the dither amplitude is quite small. It has been found that the pressure amplitude is similarly attenuated as previously discussed in the operation of the valve unit as a separate entity. It is this general area of convergence, as shown in FIGURE 7, where preferred performance of the time modulated non-linear servo-valve system exists. Theoretically an "optimum" carrier frequency for minimum dither amplitude range exists. However, in certain applications, a degree of dither is beneficial in reducing the effect of friction on resolution and is very often superimposed on "linear" systems. Thus, is can be seen that a region of open loop non-linear operation exists where the dither and pressure fluctuation amplitudes are suitably attenuated so that a substantially continuous uninterrupted nonfluctuating steady state force output can be achieved. Further, it has been shown on a first order basis that the magnitude of the force output of the control mechanism can be varied proportional to the magnitude of the input command signal by the time modulation of a non-linear servo-valve.

The application of the torque balance missile flight control concept has promulgated the use of open loop control systems utilizing an input signal proportional to an output force. Several types of open loop control systems utilizing pneumatic and hydraulic controls have been employed. However, all of these systems contain one or more precision units that make such controls both expensive and difficult to maintain. The instant novel organization utilizes a fast acting non-linear open loop control adapted to receive a carrier frequency substantially in excess of the particular system critical or resonant frequency, said carrier frequency utilized in conjunction with a fast acting fluid transfer valve sized to produce an area ratio such that a substantially continuous uninterrupted pressure level having minimum dither and pressure fluctuation can be established while simultaneously producing a substantial degree of pressure modulation in response to a variation of the input command signal.

Figure 8:
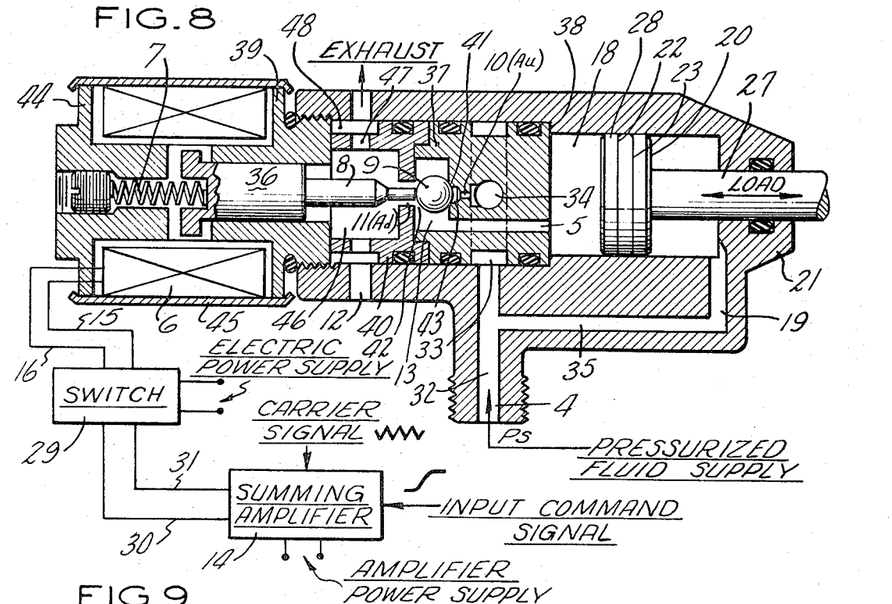
FIGURE 8 is a schematic diagram partly in cross section of a control mechanism showing the preferred embodiment of the instant invention.

Referring now to the drawings wherein like characters are used throughout to designate like elements, and more specifically to FIGURE 8 wherein is shown generally at 14 a summing amplifier, such summing amplifier being well known in the art. Said summing amplifier 14 is supplied with a source of amplification power from an appropriate power supply, not shown, said power enters said power amplifier 14 where an appropirate carrier signal and an appropriate control input signal are simultaneously fed into said summing amplifier 14 from an appropriate carrier signal generator and an appropriate control device, respectively, both of which are not shown. Said summing amplifier unit 14 combines said carrier signal and said input signal to produce a single output signal that is a composite of said carrier signal and said input signal. The composite output signal of summing amplifier 14 is transmitted to electrical switch 29 by means of electrical conduits 30 and 31. Electrical switch 29 is supplied with a source of electrical power from an appropriate power supply, not shown, said power enters electrical switch 29 and upon receipt by electrical switch 29 of a composite signal from summing amplifier 14 via interconnecting conduits 30 and 31, said electrical power supply is communicated through switch 29 to solenoid 6 via electrical conduits 15 and 16. The operation of electrical switch 29 is such that the switch closes upon receipt of a signal whose magnitude is equal to the threshold level, or above, as shown in FIGURE 2(a), and conversely the switch opens when the signal level drops below the threshold value. Thus, the action of switch 29 is to supply power to solenoid 6 via conduits 15 and 16 in an on-off or step function mode of operation. The frequency of the power pulses received by solenoid 6 from the electrical power source through switch 29 being dependent upon the frequency of the carrier signal, and the duration of the pulses being dependent upon the modulation of the carrier signal provided by the magnitude of the input command signal.

Referring again to FIGURE 8, pressurized fluid from a suitable pressurized fluid supply, not shown, is conducted to conduit 4 of actuator housing 21. Said pressurized fluid is conducted to orifice 10 via conduit 32 and interconnecting annulus 33 and passageway 34. Similarly, said pressurized fluid is simultaneously connected from conduit 4 to pressurized chamber 20 via interconnecting conduit 35. Valve housing 37 is mounted in a bore in piston housing 21 and is positioned in said piston housing 21 by shoulder 38. Solenoid housing 39 is positioned in bore 40 of piston housing 21 and threadably engages piston housing 21 such that valve housing 37 and solenoid housing 39 are secured in a fixed relation to piston housing 21 by means of shoulder 38 and the threaded engagement of solenoid housing 39 into the bore 40 of housing 21. When solenoid 6 is energized by means of an appropriate signal from switch 29 via conduits 15 and 16, guide 36 and plunger 8 fixedly secured to guide 36 are retracted compressing spring 7. Upon the retraction of plunger 8, ball 9 moves from sealing engagement with valve seat 41 to sealing engagement with valve seat 42 by means of the constant pressure present in chamber 43 in fluid communication with orifice 10, passageway 34, annulus 33 and conduit 32. The retraction of ball 9 permits fluid to flow through orifice 10 and thence through interconnecting chambers 43, 13, 5 and into chamber 18. Conversely, when solenoid 6 is de-energized, spring 7 retained by cap 44 secured to solenoid housing 39 by retaining sleeve 45 urges guide 36 and plunger 8 into engagement with ball 9 causing ball 9 to sealably engage ball seat 41 while simultaneously connecting chamber 18 to ambient exhaust port 12 via conduit 5, chamber 13, exhaust orifice 11, chamber 46, port 47 and annulus 48.

As explained in detail herein, and as shown by FIGURES 4 and 5, if by way of example the ratio of exhaust area 11 to inlet area 10 is fixed at .5, and the dynamic movement of ball 9 between valve seats 41 and 42 is such as to establish a quasi steady state condition, as described in detail herein, then the magnitude of the pressure in chamber 18 will be .5 $P_s$ at the quasi steady state null condition, providing actuator piston 28 is a half area piston for the example as described herein for FIGURE 2.

The area of piston 28 subjected to constant supply pressure $P_s$ via interconnecting port 19, passageway 35 and conduit 4 is one-half the area of the opposite side of said output piston 28 subjected to the modulated supply pressure of chamber 18. Thus, when a pressure of magnitude exactly .5 $P_s$ is impressed upon the larger area of output piston 9 and a quasi steady state condition exists, a null condition of output piston 28 exists. The modulation of the carrier signal by the input command signal can result in a modulated pressure in chamber 18 less than .5 $P_s$ such that axial motion of output piston 28 to the left results; conversely, the input command signal can also modulate the carrier signal to produce a modulated pressure in chamber 18 that is greater than .5 $P_s$, thus causing actuator piston 28 to move to the right. Hence, the magnitude of the input command signal modulates the carrier signal to produce bidirectional movement of the actuator piston dependent upon the degree of modulation, which in turn is dependent upon the magnitude of the input command signal.

Figure 9:
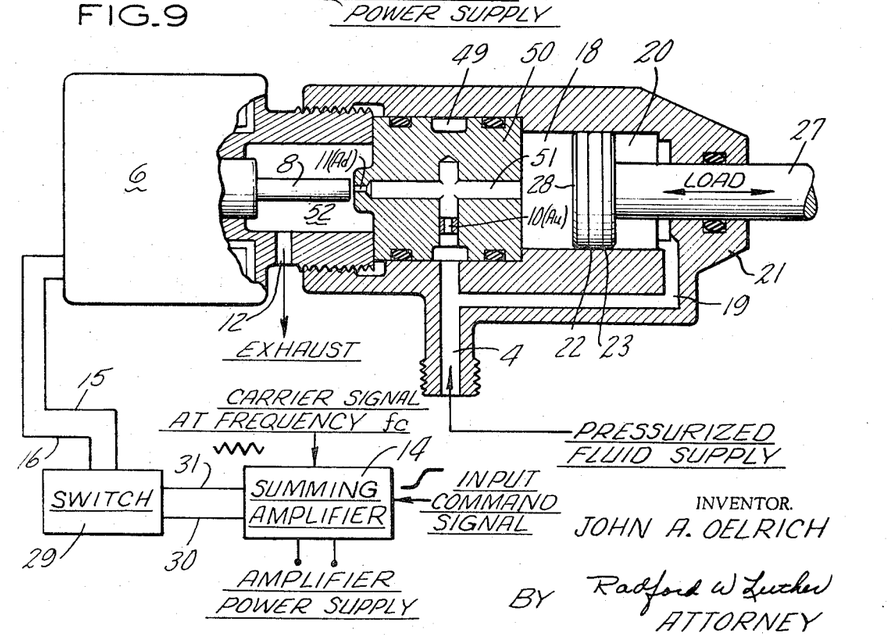
FIGURE 9 is a schematic diagram partly in cross section of a control mechanism showing an alternate embodiment of the instant invention.

FIGURE 9 shows an alternate adaptation of the time modulated control embodiment wherein a fixed inlet orifice and a variable discharge orifice is utilized. The organization shown in FIGURE 9 is a less complex arrangement than that shown in FIGURE 8. However, the range of force output is less than the arrangement shown in FIGURE 8. Also the efficiency of the organization shown in FIGURE 9 is less than that of the one shown in FIGURE 8.

Referring now to FIGURE 9 wherein is shown generally at 14 and 29, a summing amplifier and electrical switching arrangement whose operation is the same as that described herein for the organization shown in FIGURE 8. Similarly, a conventional half area servo is shown by piston 28, housing 21 and pressurized fluid chambers 18 and 20 whose operation is precisely the same as that described in detail herein for FIGURE 8. Pressurized fluid is conducted from conduit 4 to annulus 49 of spacer 50. Said pressurized fluid is thence conducted through fixed orifice 10 to interconnecting passage 51 and thence simultaneously to pressured chamber 18 and variable orifice 11. Upon the energization of solenoid 6, plunger 8 moves into sealing engagement with discharge orifice 11. When solenoid valve 6 is de-energized, a spring (not shown) urges plunger 8 away from sealing engagement with variable orifice 11. Thus, when plunger 8 is retracted, pressurized fluid passes into chamber 52 and thence through exhaust port 12 to atmosphere. When plunger 8 is in sealing engagement with orifice 11, the flow of fluid through orifice 11 is stopped and pressurized fluid passes only into chamber 18 via fixed orifice 10 and interconnecting conduit 51.

The first order indication of the ability of the organization shown in FIGURE 9 to modulate is somewhat different from that described in detail for the fixed inlet and outlet orifices three-way valve embodiment shown in FIGURE 1 and described in detail herein. Following the same assumptions described in detail for the analysis of the organization shown in FIGURE 1, the rate of fluid mass charging the volume 2 shown in FIGURE 1 can be expressed as follows:

$$\frac{dm}{dt} = \frac{C_f P_s A_u}{\sqrt{T}} \qquad (10)$$

where the rate of change of pressure is expressed as follows:

$$\frac{dp}{dt} = \frac{\gamma C_t R \sqrt{T}}{V} A_u P_s \quad (11)$$

On opening the discharge orifice of FIGURE 9 in a step fashion, fluid flows through both orifices 10 and 11. The rate of change of mass flow in volume 2 of FIGURE 2 and chamber 18 of FIGURE 9 is the difference between the inlet and the discharge flows which can be expressed as follows:

$$\frac{dm}{dt} = \frac{C_t P_s A_u}{\sqrt{T}} - \frac{C_t P_v A_d}{\sqrt{T}} \quad (12)$$

From Equation 12 it can be seen that the rate of change of pressure becomes:

$$\frac{dp}{dt} = \frac{\gamma C_t R \sqrt{T}}{V} A_u P_s \left[ 1 - \frac{P_v}{P_s} \frac{A_d}{A_u} \right] \quad (13)$$

For an increase in pressure, the discharge orifice 11 is closed for a longer period of time than it is open. Thus, the time of charging the pressure chamber 18 is $(t+\Delta t)$, and the time of discharging is $(t-\Delta t)$.

As is described in detail hereinabove for the operation of FIGURE 1, it can be seen that for small excursions $dp = \Delta p$, and that $\Delta p$ on charging is equal to $-\Delta p$ on discharging. We note that equating Equations 11 and 13, the pressure ratio becomes:

$$\frac{P_v}{P_s} = \frac{A_u}{A_d} \left[ 1 + \frac{t+\Delta t}{t-\Delta t} \right] \quad (14)$$

It can be seen that Equation 14 agrees with the steady state result where $\Delta t = 0$ in which it will be noted that at the $\Delta t = 0$, or null condition, the pressure ratio is .5 for an orifice ratio $A_u/A_d = .25$.

Figure 10:
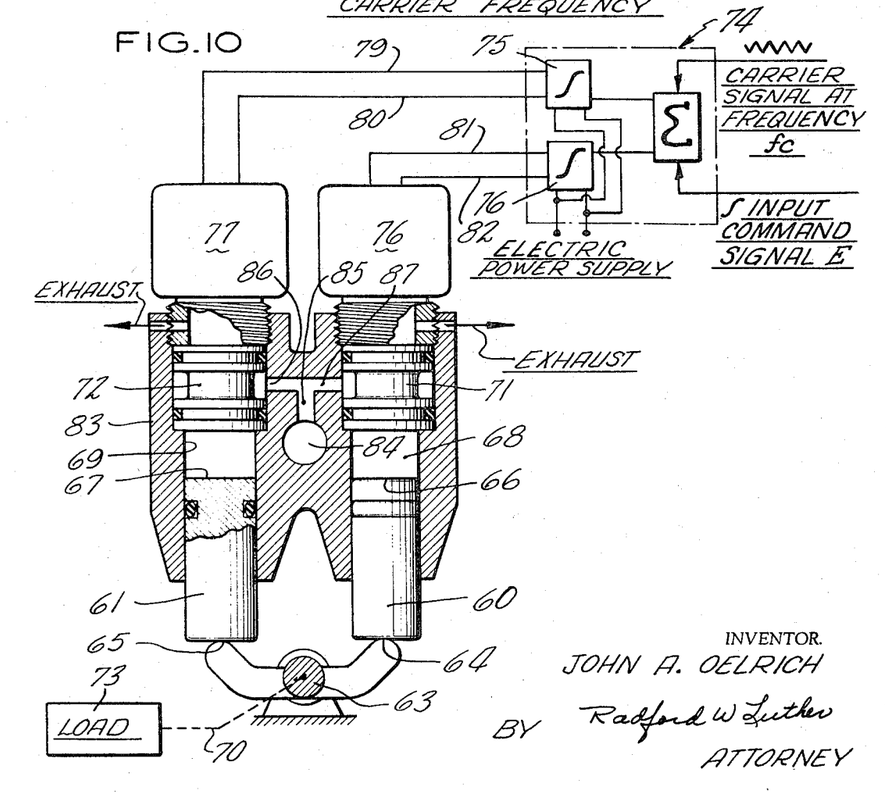
FIGURE 10 is a schematic diagram partially in cross section of a control mechanism showing a second alternate embodiment of the instant invention.

Another alternate arrangement utilizes two solenoid-valve-actuator assemblies in juxtaposed relationship to form a so-called push-push arrangement. In the push-push configuration, two actuator assemblies each having a single actuator piston 60 and 61 disposed therein with the axes of their respective actuator pistons parallel to each other, engage opposite ends of a center mounted torque arm arrangement 62. The torque arm is fixedly attached at its center to a rotatably mounted actuator shaft 63, the axis 70 of said actuator shaft being transverse a plane in which the opposite ends of said rocker arm are positioned. The opposite ends of said rocker arm 62 each engage one end of separate actuator pistons 60 and 61 of the respective juxtaposed actuator assemblies at points 64 and 65. The other end of each of said separate actuator pistons 60 and 61 has an equal area 66 and 67 exposed to pressurized fluid. The actuator assemblies are so constructed that pressurized fluid is conducted to only the one end 66 and 67 of each piston. Thus, when equal pressure is present in chambers 68 and 69 and is exerted on the ends 66 and 67 both pistons 60 and 61, each of said pistons produces an equal force which is transmitted to its respective point of engagement 64 and 65 with its half of said torque arm such that an equal but opposite torque is produced by the two halves of the rocker arm. This equal but opposite torque condition produces an equilibrium or null condition about the rotative axis of said actuator shaft. A time modulated fluid transfer mechanism shown generally at 71 and 72 of either the two fixed orifices in series or the single fixed orifice with the second variable area orifice, both described in detail hereinabove, can be utilized to supply a time modulated pressure to the pressurized end of each of said actuator pistons.

The input circuit shown generally at 74 is similar to the summing amplifier and switching arrangement described in detail for FIGURE 8 herein. However, two electrical switches 75 and 76 each similar in operation to switch 29 described in FIGURE 8 are used. Electrical switches 75 and 76 differ from each other in operation in that one switch is energized at a signal whose magnitude is greater than the threshold value, while the other switch is de-energized when a signal of similar magnitude is impressed thereon. Switch 75 energizes solenoid 77 via conduits 79 and 80, and switch 76 energizes solenoid 78 via conduits 81 and 82. Solenoids 77 and 78 are threadably secured to housing 83 and operatively engage fluid transfer mechanisms 71 and 72. Pressurized fluid is simultaneously supplied to chambers 68 and 69 from a source of pressurized gas 84 via interconnected passageways 85, 86 and 87. Either of the two time modulated fluid transfer organizations are operationally connected to the juxtaposed actuator pistons via chambers 68 and 69 such that the pressure in the chamber of one piston increases from the null position, while the pressure in the other chamber decreases. Thus, for a variation in input control signal, the force output of the two pistons varies from a zero or null position to produce either an increased or decreased force output such that either clockwise or counterclock rotation of the actuator shaft 63 and its integrally connected reactive load shown schematically at 73 is produced; dependent upon the magnitude of the input command signal with respect to the zero or null value. Some of the potential advantages of this so-called push-push system are that a more linear input-output relationship is possible, coupled with the elimination of backlash by the use of a substantially constant force on the rocker arm.

While the preferred embodiments of the invention have been shown, it is to be understood that this invention is not limited to the precise construction and arrangement of elements disclosed by way of illustration, since these may be changed and modified by those skilled in the art without departing from the spirit of the invention.

What I claim is:

1. A control mechanism including a pressure responsive actuator secured to a control element comprising, a source of pressurized compressible fluid, fluid transfer means having at least one chamber receiving said source of pressurized fluid, means adapted to receive a varying input command signal and a carrier signal to effect at least one modulated output signal, said fluid transfer means constructed and arranged to receive said modulated output signal and responsive to said modulated output signal vary the pressure in the chamber of said fluid transfer means at frequencies greater than the critical frequency of said control element such that a substantially continuous finite pressure is produced by said fluid transfer means for each finite input signal, said substantially continuous chamber pressure communicated to said actuator thereby controlling the position of said actuator and said control element.

2. A control mechanism as described in claim 1 wherein said fluid transfer means comprises a solenoid operated valve having an inlet, an outlet and a chamber intermediate said inlet and outlet, with said source of pressurized compressible fluid connected to said inlet, and having the valve element alternately positioned in engagement with said inlet and said outlet at a frequency greater than the critical frequency of said control mechanism responsive to said modulated output signal applied to said solenoid thereby generating a substantially continuous pressure in said chamber.

3. A control mechanism as described in claim 1 wherein said fluid transfer means comprises a housing, a fixed inlet orifice for supplying pressurized compressible fluid to said housing, an outlet passage discharging fluid from said housing, a solenoid operated member mounted adjacent said outlet passage, said solenoid operated member positioned to alternately increase and decrease the pressure in said housing at a frequency greater than the critical frequency of said control mechanism responsive to said modulated output signal such that a substantially continuous finite pressure for each finite output signal is generated in said housing, means connecting said housing to said pressure responsive actuator such that said substantially continuous pressure is communicated to said pressure responsive actuator.

4. A device as claimed in claim 1 wherein said pressure responsive actuator comprises an arm pivotably mounted intermediate the ends thereof, said arm having a control element secured thereto, a first and a second piston, one of the opposed ends of said rocker arm operatively engaging one end of said first piston, the other of said opposed ends engaging one end of said second piston, separate chambers in fluid communication with the other end of each of said first and said second pistons respectively, signal conditioning means including a pair of switches constructed and arranged to simultaneously receive the same input signal and generate two separate output signals, each of said two separate output signals communicated to a separate solenoid wherein each of said solenoids is operatively associated with a separate one of said chambers such that said substantially continuous pressure in one of said separate chambers will increase while said substantially continuous pressure in the other of said separate chambers will decrease thereby producing a rotative movement of said rocker arm about said rocker arm pivot thereby controlling the position of said control element.

5. In combination with a pressure responsive actuator having a limited operational frequency, fluid transfer means connected to said actuator, said fluid transfer means constructed and arranged to receive a source of pressurized compressible fluid and to alternately restrict and discharge said pressurized fluid at a frequency greater than said operational frequency to form a pneumatic time constant and provide a substantially nonpulsating effective pressure to said actuator, and means for varying the relative restrictive and discharge time for said pressurized fluid to thereby vary said effective pressure, wherein said means for varying the relative restrictive and discharge time includes means receiving a carrier signal and a command signal and discharging a single modulated output signal, said modulated output signal variable responsive to a variable input signal, and said fluid transfer means comprises a solenoid operated valve said solenoid adapted to receive said output signal and said valve comprises a chamber having an inlet, an outlet and a valve element positioned therebetween wherein the solenoid actuated valve element alternately opens and closes said inlet and said outlet to produce a substantially nonpulsating pressure in said chamber, the magnitude of said substantially nonpulsating pressure variable responsive to an input signal having a variable magnitude.

6. In combination with a pressure responsive actuator having a limited operational frequency, fluid transfer means connected to said actuator, said fluid transfer means constructed and arranged to receive a source of pressurized compressible fluid and to alternately restrict and discharge said pressurized fluid at a frequency greater than said operational frequency to form a pneumatic time constant and provide a substantially nonpulsating effective pressure to said actuator, and means for varying the relative restrictive and discharge time for said pressurized fluid to thereby vary said effective pressure, wherein said means for varying the time includes signal modulating means that receives a carrier signal and a command signal and discharges a single modulated output signal, and said fluid transfer means comprises a housing, a fixed inlet orifice connected to said housing, and an outlet orifice discharging fluid from said housing, a solenoid operated member mounted adjacent said outlet and adapted to alternately position said member to open and close said outlet responsive to said output signal and thereby produce a substantially nonpulsating pressure in said housing, said pressure variable responsive to a variable input signal.

7. In combination with a pressure responsive actuator having a limited operational frequency, fluid transfer means connected to said actuator, said fluid transfer means constructed and arranged to receive a source of pressurized compressible fluid and to alternately restrict and discharge said pressurized fluid at a frequency greater than said operational frequency to form a pneumatic time constant and provide a substantially nonpulsating effective pressure to said actuator, and means for varying the relative restrictive and discharge time for said pressurized fluid to thereby vary said effective pressure, wherein said means for varying the time includes a pair of signal modulating means that receive a single carrier frequency and a single command signal and discharge a pair of modulated output signals, said actuator means comprises a rocker arm pivotably mounted intermediate the ends thereof, a separate piston engaging only one of the opposite ends of said rocker arm, one end of each piston operatively connected to one end of said rocker arm, a separate solenoid operated fluid transfer means connected to the end of each of said pistons opposite the end in engagement with said rocker arm, each of said fluid transfer means adapted to receive one of said modulated output signals such that said substantially nonpulsating pressure in one fluid transfer means will increase while said substantially nonpulsating pressure in the other of said fluid transfer means will decrease thereby producing a rotative movement of said rocker arm about said pivot.

8. A control mechanism having a pressure controlled actuator, a pressure regulator comprising at least one chamber having an inlet and an outlet, means connecting said inlet with a source of pressurized compressible fluid, means connecting said actuator with said chamber to form a pneumatic time constant, means creating an interrupted output signal having a frequency higher than the critical frequency of said control mechanism, means changing the effective size of said inlet and said outlet to thereby vary the pressure in said chamber, means applying said output control signal to said effective size changing means to change the relative sizes of said inlet and outlet responsive to said control output signal and thereby generate an effective nonpulsating pressure in said chamber.

9. A control mechanism as described in claim 8 wherein said pressure regulator comprises a solenoid operated ball valve and said signal conditioning means comprises a summing amplifier receiving said carrier signal and said control input signal to generate a single modulated output signal that is applied to a switch to produce said interrupted signal wherein said interrupted signal is applied to said solenoid to generate a substantially nonpulsating pressure in said chamber.

10. A control mechanism as described in claim 8 wherein said pressure regulator comprises a device having a chamber with a fixed inlet orifice and a solenoid controlled variable area outlet orifice in series flow relationship, and said signal conditioning means comprises a summing amplifier receiving a carrier signal and a separate input signal to generate a single modulated output signal that is applied to a switch to produce an interrupted signal wherein said interrupted signal is applied to said solenoid to produce a substantially nonpulsating pressure in said chamber.

11. The control mechanism of claim 8 wherein the pressure controlled actuator comprises a pair of juxtaposed pistons having parallel longitudinal axes, in combination with a rocker arm pivotably mounted equidistant the ends thereof, the respective ends of said rocker arm operatively engaging one end of a different one of said pistons, and the pressure regulator comprises a pair of solenoid operated regulator means each of said regulator means having a chamber including an inlet and an outlet, one of said regulator means fluidly connected to a different one of said pistons, a source of pressurized compressible fluid connected to said pressure regulator means, signal conditioning means receiving a single input signal and generating and applying responsive to said single input signal separate modulated pulsed output signal to each of said solenoid such that the effective sizes of the inlet and outlet of both of said regulator means are controlled to thereby generate a substantially nonpulsating pressure that is applied to the end of each of said pistons not in engagement with said rocker arm to produce bidirectional rotative movement of said rocker arm.

References Cited

UNITED STATES PATENTS 3,094,132   6/1963   Byloff _____________ 91—47 X

JOHN J. CAMBY, *Primary Examiner.*